(12) United States Patent
Butz

(10) Patent No.: US 7,631,456 B2
(45) Date of Patent: Dec. 15, 2009

(54) WIND ARTICULATED WATERFOWL DECOY HAVING DISTINCT SIDES

(75) Inventor: Scott Allen Butz, Argusville, ND (US)

(73) Assignee: Reel Wings Decoy Company, Inc., Fargo, ND (US)

( * ) Notice: Subject to any disclaimer, the term of this patent is extended or adjusted under 35 U.S.C. 154(b) by 17 days.

(21) Appl. No.: 11/649,575

(22) Filed: Jan. 4, 2007

(65) Prior Publication Data

US 2008/0163538 A1    Jul. 10, 2008

(51) Int. Cl.
*A01M 31/06* (2006.01)
(52) U.S. Cl. .............................................. 43/3
(58) Field of Classification Search ........................ 43/2, 43/3
See application file for complete search history.

(56) References Cited

U.S. PATENT DOCUMENTS

| | | |
|---|---|---|
| 72,855 A | 12/1867 | Hughes |
| 743,301 A | 11/1903 | Lischtiak |
| 2,341,028 A | 2/1944 | Fay ................................ 43/3 |
| 2,441,753 A | 5/1948 | Carpenter ........................ 43/3 |
| 2,442,417 A | 6/1948 | Lang .......................... 244/153 |
| 2,566,029 A | 8/1951 | Louthan ..................... 43/43.13 |
| 2,711,608 A | 6/1955 | Fulster ............................ 43/3 |
| 2,762,590 A | 9/1956 | Hui ............................. 244/153 |
| 3,044,208 A | 7/1962 | Minera ...................... 43/43.13 |
| 3,110,460 A | 11/1963 | Hughes |
| 3,216,147 A | 11/1965 | Minera ...................... 43/43.13 |
| 3,358,399 A | 12/1967 | Waldmann ........................ 43/4 |
| 3,736,688 A | 6/1973 | Caccamo ......................... 43/3 |
| 3,768,192 A | 10/1973 | Caccamo ......................... 43/3 |
| 4,012,017 A | 3/1977 | Springston et al. .......... 244/153 |
| 4,099,690 A | 7/1978 | Mendelsohn ................. 244/153 |
| 4,228,977 A | 10/1980 | Tanaka ........................ 244/153 |
| 4,318,240 A * | 3/1982 | Hillesland ........................ 43/3 |
| 4,651,457 A * | 3/1987 | Nelson et al. .................... 43/3 |
| 4,669,684 A | 6/1987 | Vernelson et al. ........... 244/153 |
| 4,753,028 A * | 6/1988 | Farmer ............................ 43/3 |
| 4,779,825 A | 10/1988 | Sams ........................... 244/153 |
| 4,845,872 A * | 7/1989 | Anderson ........................ 43/3 |
| 4,848,704 A | 7/1989 | Sams ........................... 244/153 |
| 4,885,861 A | 12/1989 | Gazalski .......................... 43/3 |
| 4,911,384 A | 3/1990 | Stankus ....................... 244/153 |
| 4,972,620 A * | 11/1990 | Boler .............................. 43/3 |
| 5,003,722 A | 4/1991 | Berkley et al. ................... 43/3 |
| 5,172,506 A | 12/1992 | Tiley et al. ....................... 43/3 |
| 5,515,637 A | 5/1996 | Johnson .......................... 43/2 |
| 5,524,851 A | 6/1996 | Huang ......................... 244/153 |
| 5,598,988 A | 2/1997 | Bukur ......................... 244/153 |
| 5,893,428 A | 4/1999 | Fasse et al. ................... 180/403 |
| 6,044,581 A | 4/2000 | Shipman et al. .................. 43/3 |
| 6,095,458 A | 8/2000 | Cripe .......................... 244/153 |
| 6,349,902 B1 | 2/2002 | Cripe .......................... 244/153 |
| 6,357,160 B1 | 3/2002 | Hackman et al. ................. 43/2 |
| 6,381,896 B1 * | 5/2002 | Coker ............................. 43/3 |
| 6,460,284 B1 * | 10/2002 | Rabo .............................. 43/3 |
| 6,481,147 B2 | 11/2002 | Lindaman ........................ 43/2 |
| 6,658,782 B2 | 12/2003 | Brint .............................. 43/2 |
| 6,658,784 B1 | 12/2003 | Mastropaolo ............. 43/43.13 |
| 6,698,132 B1 * | 3/2004 | Brint .............................. 43/2 |

(Continued)

*Primary Examiner*—Kurt Rowan

(57) ABSTRACT

This waterfowl decoy is designed and constructed having a planar body resulting in to substantially identical sides. Each of these sides can then be covered with distinct graphic designs enabling one decoy to mimic two different types or species of waterfowl. The decoy may further be provided with a weighted section near the head for keeping the decoy from blowing away or magnetically attaching the decoy to a positioning rod, or to aid in the storage of the decoys.

15 Claims, 15 Drawing Sheets

U.S. PATENT DOCUMENTS

| | | | |
|---|---|---|---|
| 6,782,653 B1 | 8/2004 | Thomas | 43/3 |
| 7,028,429 B1 | 4/2006 | Druliner | 43/3 |
| 2004/0237373 A1 | 12/2004 | Coleman | 43/3 |
| 2005/0252066 A1* | 11/2005 | Couvillion, III | 43/3 |
| 2006/0143969 A1 | 7/2006 | Lindaman | 43/2 |
| 2006/0143970 A1 | 7/2006 | Lindaman | 43/2 |

* cited by examiner

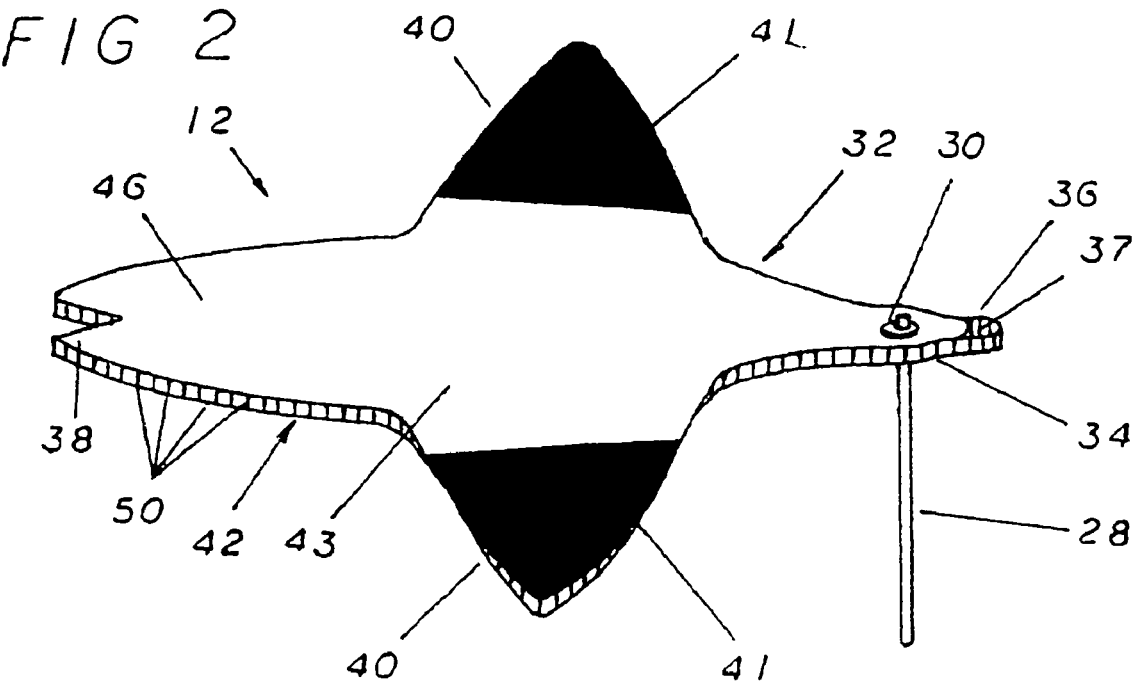
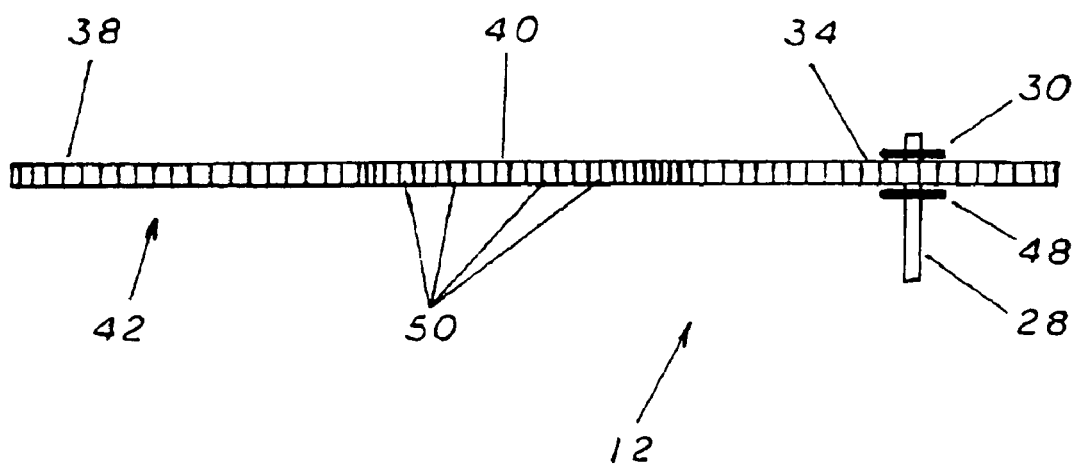

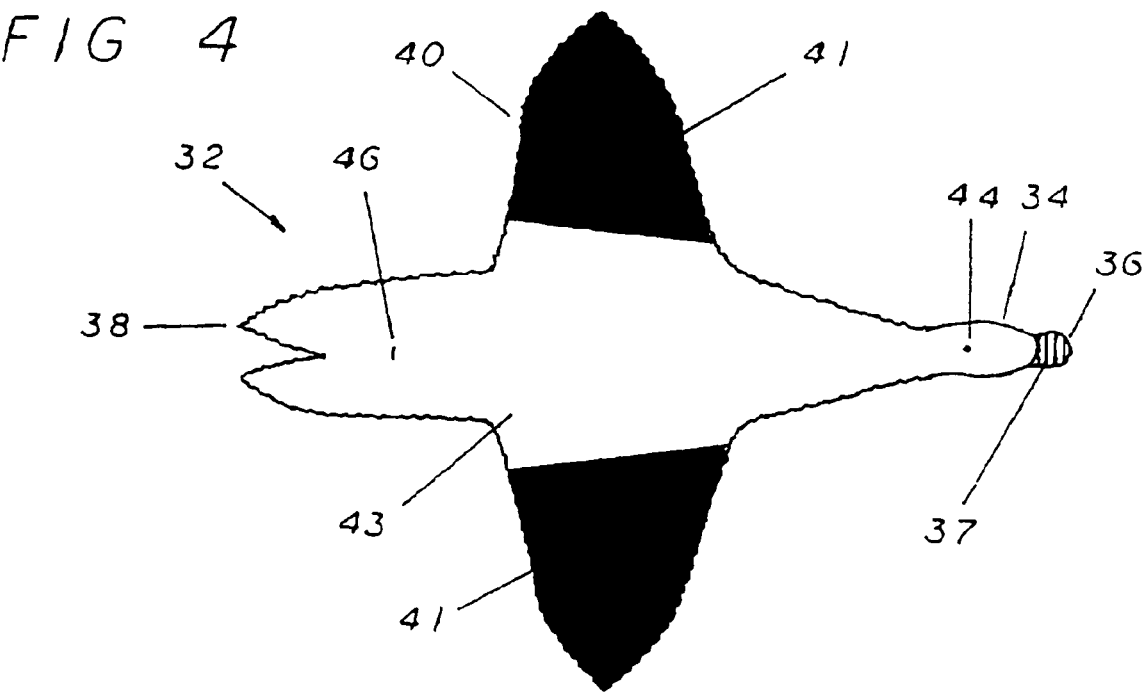
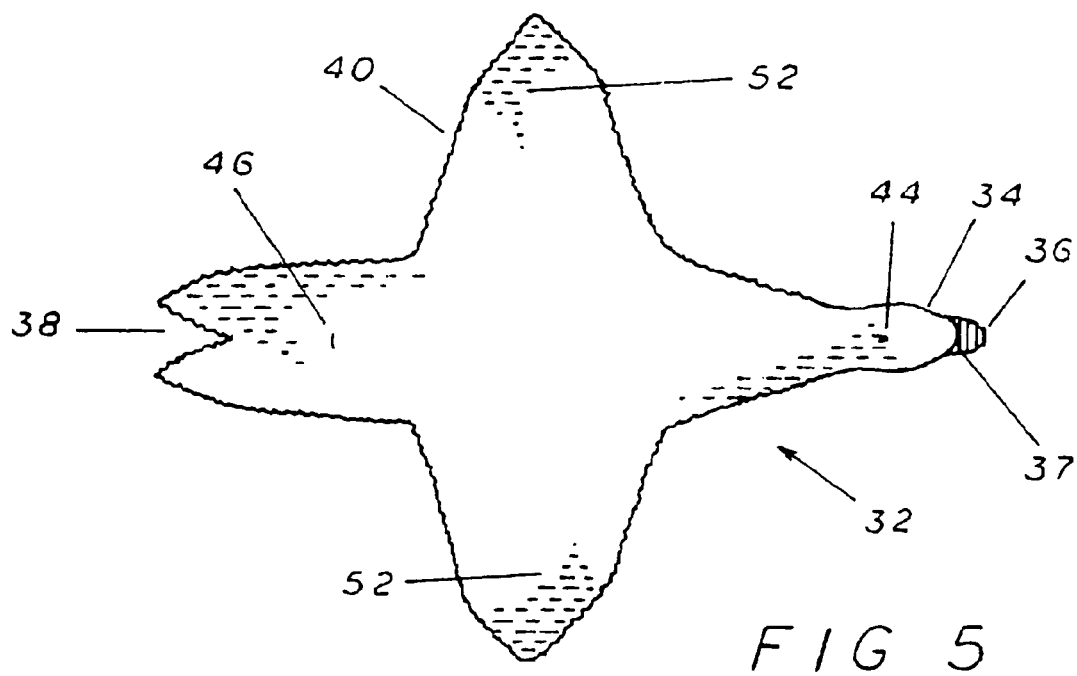

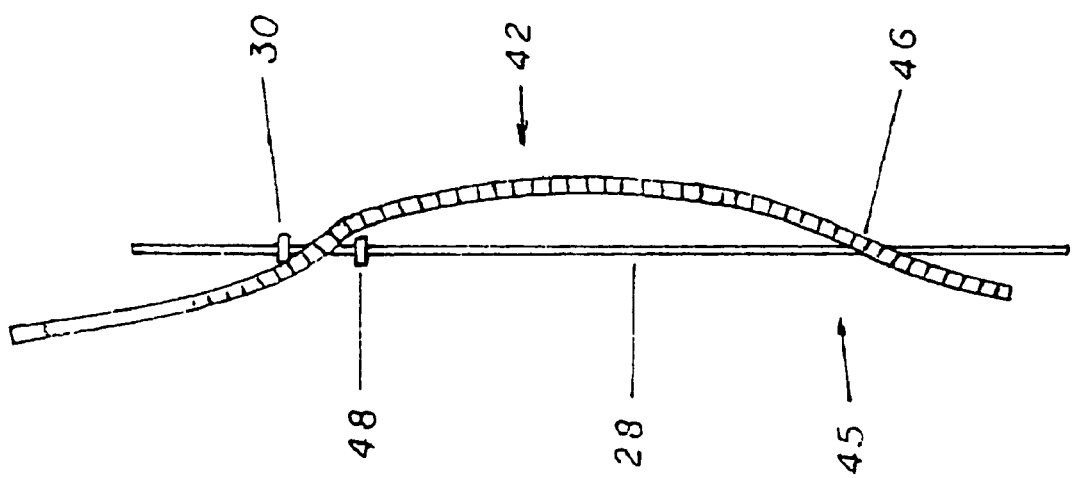

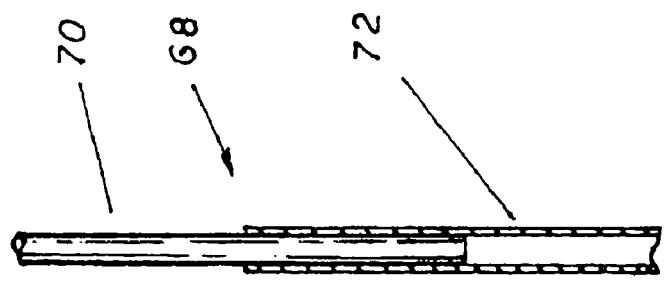
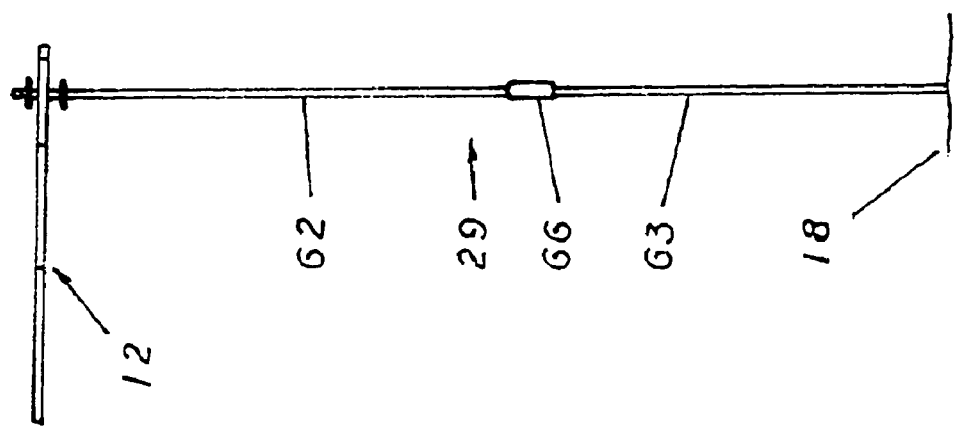

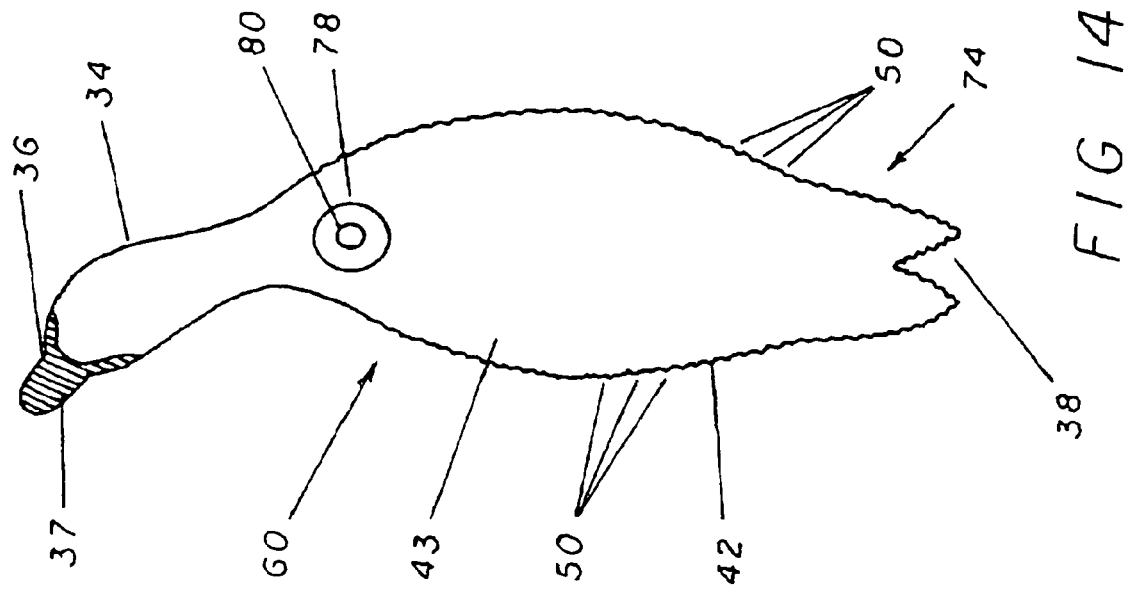
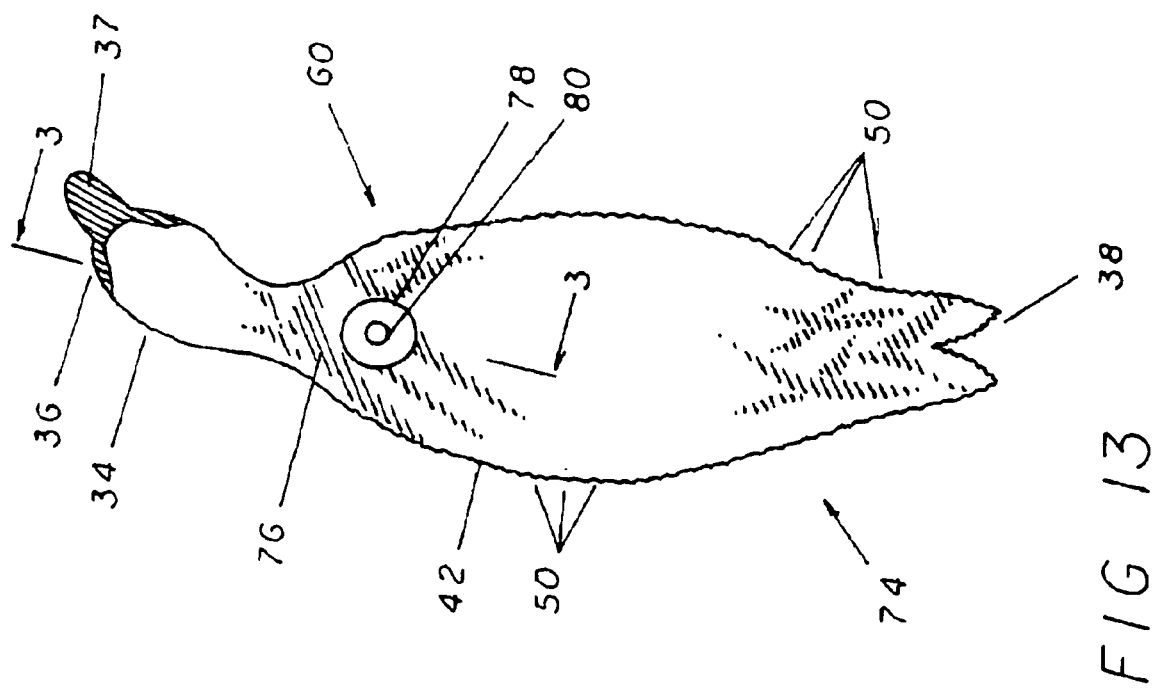

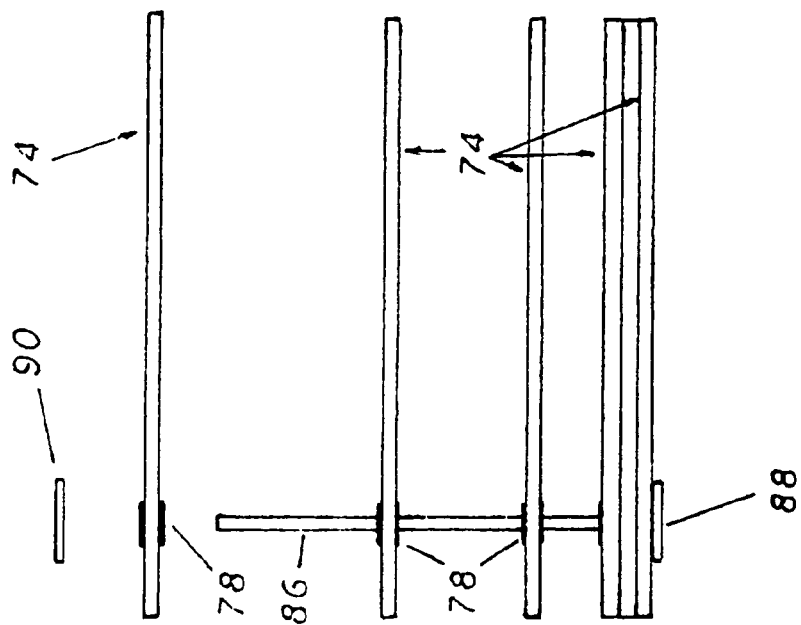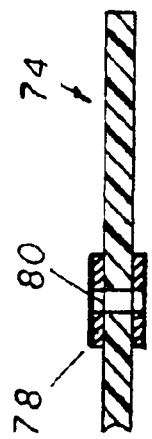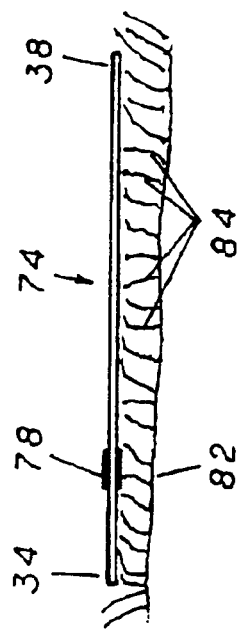

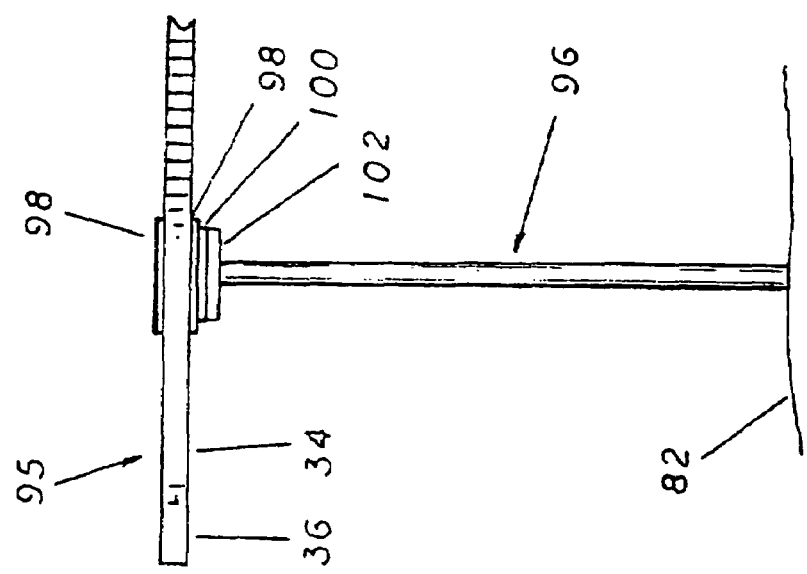
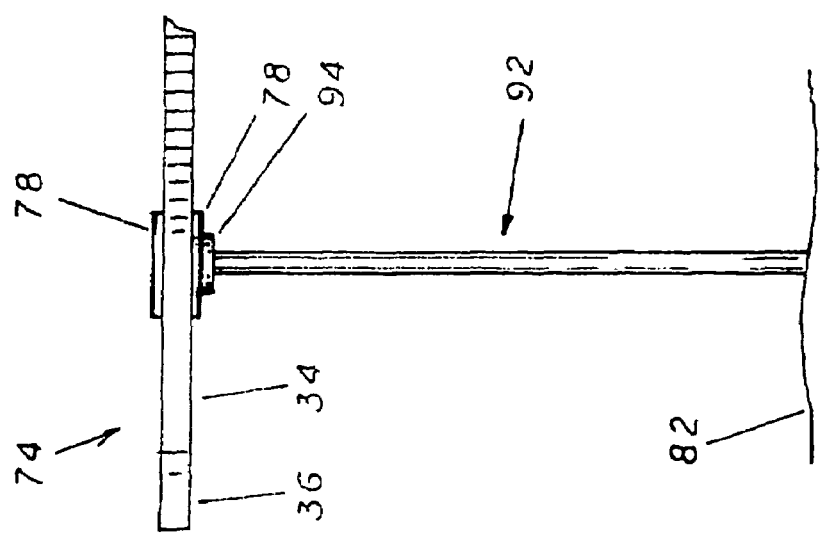

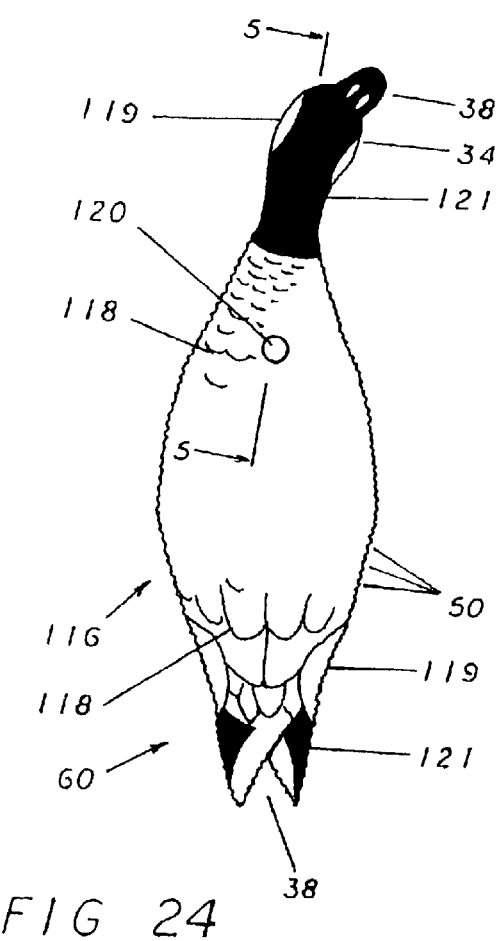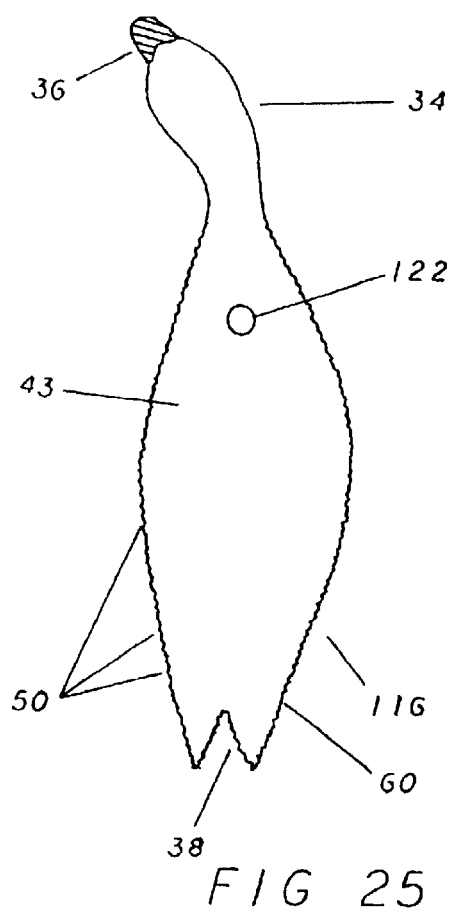
FIG 24
FIG 25

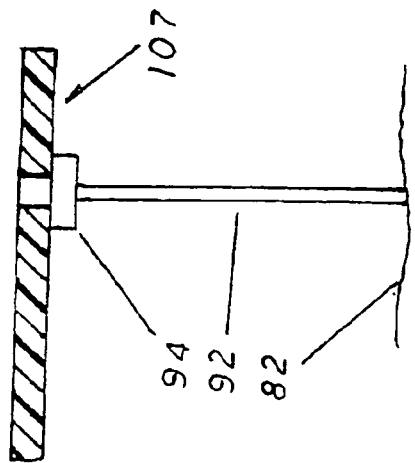
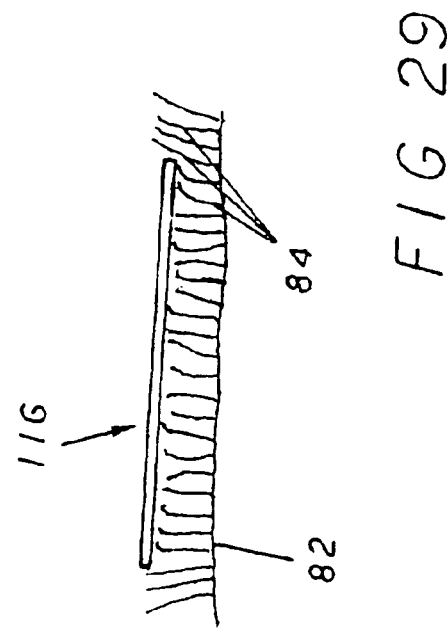
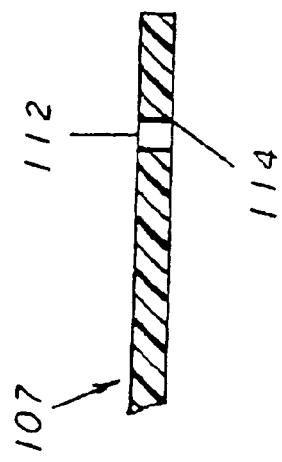
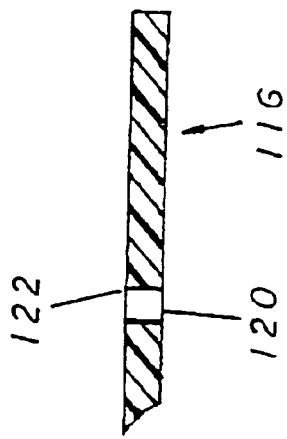

WIND ARTICULATED WATERFOWL DECOY HAVING DISTINCT SIDES

BACKGROUND OF THE INVENTION

The present invention relates to an improvement in the methods employed by hunters to attract waterfowl to a specific hunting area. More specifically, to a distinctly sided waterfowl decoy that is designed in a manner so that each of the two sides of the decoy will mimic one type (gender or relative age) of waterfowl or even different species of waterfowl. Additionally, this distinctly sided waterfowl decoy will be constructed in a manner so that when properly deployed, it will flutter in the wind in order to perform its attracting function in a more efficient manner.

Hunters have used decoys in their pursuit of waterfowl throughout history. Generally, this involves the placement of waterfowl decoys either on the surface of a body of water or dispersed in an open field. The decoys used for this purpose are constructed in a manner so that they resemble the specific species of waterfowl that the hunter is pursuing thereby increasing the hunter's chances of attracting that species of waterfowl.

The placement of the decoys in this manner constructs an illusion that the area is populated with waterfowl of an identifiable species which in turn draws waterfowl of that species into the area. The hunter takes up a concealed position such as a hunting blind, a camouflaged boat, a stand of reeds or brush, or any other suitable position that is located adjacent to the deployed decoys. This method of hunting allows the hunter to take his quarry as they enter the kill zone to land among the decoys.

While this method of hunting waterfowl has proven to be successful over time, it has limitations. The first of these is that the most commonly used decoys are too static and consequently do not mimic the characteristics of waterfowl whether they be in flight, on the surface of a body of water, or feeding on land. Additionally, these types of decoys are generally bulky making them hard to transport and are relatively expensive to manufacture and own. Finally, the very nature of these types of decoys requires the use of different decoys to attract different species of waterfowl. Again, this tends to exacerbate the difficulties associated with their relative bulk and cost.

While these decoys are at least partially effective in their designed purpose, it has been understood for a long period of time that it would be beneficial to somehow provide a more dynamic decoy. In order to accomplish this, it was necessary to provide a means of accurately mimicking the flight characteristics of waterfowl to further enhance the overall effectiveness of deployed decoys. The prior art illustrates numerous attempts at providing such decoys, the bulk of which can be divided into two general categories. The first of these can be described as kite-like in their manner of operation and appearance. While these are generally effective in their designed purpose, they are not relevant to the specifics of this discussion.

The second general category is made up of wind articulated decoys that are anchored in the hunting area by means of pole or rod. This category can then be further broken down into those that are connected to the mount pole in a central location. This type tends to spin around this mounting when affected by the wind. The second type is connected to the pole at one end of its body, most commonly that end that depicts the head of the target species. This type tends to flutter out in a generally horizontal manner much like the operation of an airport's wind sock.

While these animated waterfowl decoys have been shown to be effective in attracting the desired waterfowl they still suffer from deficiencies. The most significant of these is that they still require the use of a plurality of units to mimic different species or even different individuals with a given species. This limitation operates to impact the overall effectiveness of these decoys thereby providing the opportunity for improving these waterfowl decoys.

Therefore, from the forgoing discussion it can be seen that it would be desirable to provide a waterfowl decoy that can be produced in a cost-effective manner thereby allowing for their use in a greater variety of circumstances. It can also be seen that it would be desirable to provide such a waterfowl decoy that is both compact and lightweight making it easier to use and to transport. Additionally, it can be seen that it would be desirable to provide a waterfowl decoy that is capable of mimicking more than one species or type of waterfowl thereby lessening the costs associated with their use.

SUMMARY OF THE INVENTION

It is the primary objective of the present invention to provide a waterfowl decoy that can be deployed within a hunting area that is capable of mimicking the natural action of waterfowl in both the flying and feeding modes in such a way that attracts the desired waterfowl.

It is an additional objective of the present invention to provide such a waterfowl decoy that is constructed in such a manner so that it is both compact and easy to store thereby enhancing its operation to the user.

It is a further objective of the present invention to provide such a waterfowl decoy that is simple and inexpensive to construct making it available to a broader range of recreational hunters.

It is a still further objective of the present invention to employ such a waterfowl decoy that is comprised of two sides that each has distinctive graphics mimicking one species or variant on one side and another on the other side.

These objectives are accomplished by the use of a wind articulated waterfowl decoy having distinct sides that can be deployed within a hunting area to attract the desired species of waterfowl. In a typical hunting situation this is generally accomplished by placing a plurality of the decoys comprising the present invention in a desirable location, generally in and around a body of water, that is highly visible to waterfowl as they fly by. Ideally, the placement of the present invention is accomplished in such a manner so that there is cover nearby giving the hunter a place within which he can conceal himself from any approaching waterfowl. The presence of the decoys serves to draw other waterfowl to the area thereby providing the hunter with the opportunity of harvesting the maximum number of birds allowed by law.

The placement of the individual decoys of the present invention is accomplished by the use of a positioning rod. The positioning rod is a relatively small diameter section of metallic or other durable yet flexible material that can be easily inserted into the land that either surrounds or underlies a body of water. This is normally done so that the positioning rod assumes a generally vertical orientation. The body of the present invention is attached to the upper portion of the positioning rod in such a manner so that it is capable of movement around this attachment. Additionally, the positioning rod can be constructed of varying lengths and composed of differing compositions, such as one piece, two piece, or collapsible configurations.

The present invention is constructed of a light weight but durable plastic such as depron or expanded polypropylene.

The use of this material not only has benefits in the construction of the present invention as it is easily formed, but also it is very light yet strong enough to withstand impact and other forces commonly encountered when deployed within a hunting area. Additionally, the use of this material provides cost benefits as it is relatively inexpensive allowing hunters to purchase a variety of differing designs of the present invention. This allows them to adjust their hunting techniques to fit varying conditions.

The body of the present invention is planar in its general configuration having two sides that roughly mimic the shape of waterfowl when viewed from the side. The two-sided nature of the body of the present invention is critical to its operation and will be discussed in greater detail below. Additionally, the use of the materials described above provides a degree of flexibility to it which further enhances its waterfowl mimicking characteristics.

The attachment of the body of the present invention to the positioning rod is accomplished by the use of a rod attachment hole that passes through the body of the present invention. The positioning of the rod attachment hole with respect to the body of the invention is most commonly accomplished towards its proximal end, or that portion of the body that mimics the head of a particular species of waterfowl. This manner of construction has been found to produce the most effective decoy as it allows the majority of the body to be extended out from the positioning rod in a horizontal position by the action of the wind. This produces a waterfowl decoy that appears lifelike to passing bird populations therefore drawing them to the hunting-area and the concealed hunter.

As previously stated, the actual attachment of the body to the positioning rod is accomplished by passing the positioning rod through a positioning rod hole. The positioning rod hole is in turn lined with a rod sleeve. The rod sleeve is generally made of a hard plastic or other similar material that has better wear properties than the body of the present invention. Additionally, the rod sleeve is constructed so that its outside diameter fits tightly within the opening of the rod attachment hole. This ensures that once properly positioned, the rod sleeve will remain in the desired location. The inside diameter of the rod sleeve is slightly larger than the outside diameter of the positioning rod. This allows it to slide easily over the positioning rod during installation and to easily move both rotationally and along the vertical axis during the operation of the present invention.

The securement of the body of the present invention to the desired location on the positioning rod is accomplished by the use of the upper and lower retainers. The upper and lower retainers are essentially rubber (or other suitable material) washers that have an inside diameter that is slightly smaller than the outside diameter of the positioning rod and an outside diameter that is larger than the rod attachment hole. The size of the inside diameter of the upper and lower retainers and the use of a pliable material in their construction allows for their placement along the axis of the positioning rod in a manner that restrains the movement of the body of the present invention yet can be easily modified when necessary.

Therefore, the assembly of the present invention for use is accomplished in the following manner. First, the lower retainer is pushed onto the positioning rod and slid to the desired spot along its axis. Next, the body of the present invention is fitted with the rod sleeve and the unit is then slid onto the positioning rod above the lower retainer. The body's location on the positioning rod is then secured by pushing the upper retainer onto the positioning rod above the body. This configuration then allows the body to both freely rotate around its pivotal connection to the positioning rod and to move laterally between the upper and lower retainers. Finally, the completed unit can then be deployed by inserting the lower portion of the positioning rod into the ground or bottom of a body of water in the desired location.

The body of the present invention can be formed to have any desirable shape. In the illustrated case, it is shown in two possible configurations, the flying body and the feeding body. As implied, these specific body styles are designed to mimic natural states in the life of typical waterfowl. It is important to note that the illustrated variations are intended for illustrative purposes only and, therefore, many other variations are possible and should be included in the scope of this description.

The illustration of the present invention also show the possible variations in the graphic designs employed and the two sides of the bodies of the present invention. The ability to vary the graphic designs on either side of the body is central to the present invention as it allows a hunter to mimic a larger variety of waterfowl with the fewest actual decoys. This ability lowers the cost of the use of hunting decoys thereby allowing for their use with a broader number of users. Again, the illustrated graphic variations are intended to be illustrative and should not be viewed as to limit the scope of this discussion to those illustrated variations.

Additionally, a plurality of alternative embodiments of the present invention have been contemplated. The first of these is a simple weighted decoy. The weighted decoy is generally shaped much like the feeding body as described above differing primarily in the mechanism employed to secure them in the desired location. The weighted decoys are fitted with relatively large metallic discs that are attached on either side of the body in its longitudinal center and towards their forward ends.

The weighted decoys are typically deployed in the stubble of a harvested grain field. These fields are very attractive to waterfowl as there is always residual grain that provides a excellent food source. The weighted decoys are deployed simply by tossing them onto the stubble in the desired locations. The metallic discs, by virtue of their added weight and location on the body of the weighted decoys, provide enough stability to keep the weighted decoys in the desired area while still allowing for a small degree of motion in windy circumstances that enhances their life-like appearance.

The metallic discs also contain a centralized storage hole that not only passes through them, but through the body of the weighted decoy as well. The storage hole provides a means for storing and transporting a plurality of the weighted decoys when not in use. This is accomplished by the use of the storage rod. The storage rod is a long and thin cylindrical rod having a lower retainer fixedly attached to its lower end and a removable upper retainer. With the upper retainer removed, a plurality of weighted decoys can be placed on the storage rod by passing the storage rod through the storage holes. When the desired number of weighted decoys have been stacked on the storage rod, the upper retainer is replaced to secure them for storage or transport. The use of this system provides for the secure storage and transport of a large number of weighted decoys in a relatively small space. Additionally, the storage rod system may also be employed with the previously described embodiments of the present invention with slight modifications to their manner of construction.

An additional embodiment of the present invention has been contemplated in which a magnetic positioning rod is employed to suspend a weighted decoy in a horizontal manner up off of the ground. The magnetic positioning rod has a magnet fixedly attached to its upper end. This magnet is configured in a manner that allows it to easily engage and secure one of the weights on a weighted decoy while the other end of the magnetic positioning rod is anchored in the ground. The use of the magnetic positioning rod provides for the placement of a weighted decoy in a manner so that it can more easily interact with the wind thereby increasing its motion and life-like appearance. Thus, the use of the magnetic positioning rod can increase the effectiveness of the present invention.

A further alternative embodiment of the present invention has been contemplated employing the use of a loop and hook decoy. The loop and hook decoy is constructed exactly as described above for the weighted decoy except that the weights are replaced by loop patch and the magnetic positioning rod is replaced by a loop and hook positioning rod. The loop patches are placed on either side of the body of the loop and hook decoy in the same position that surrounds the storage hole. The loop and hook positioning rod is in turn fitted with an attachment head on its upper end. The attachment head in turn provides for the fixed attachment of a hook patch. When pressed together, the loop and hook patches form a secure attachment that can be broken with the application of enough force. This configuration thus provides a manner to position a loop and hook decoy in much the same manner as described above for the previous embodiment of the present invention.

A still further alternative embodiment of the present invention has been contemplated that employs a swivel positioning rod to position a weighted (or other embodiment) decoy up off of the ground. The swivel positioning rod has a swivel head pivotally attached to its upper end. The swivel head then provides for the fixed attachment of a magnet (or other attachment means) that is then employed to position a weighted decoy in the desired location. The use of the swivel positioning rod provides an additional dimension to the motion of the weighted decoy allowing it not only to spin around its point of pivotal attachment, but also to pivot in the vertical plane relative to this same point of attachment. The use of the swivel positioning rod provides an additional measure of life mimicking motion that further increases the effectiveness of the present invention.

A yet further alternative embodiment of the present invention has been contemplated in which a flying body is fitted with a cylindrical metallic plug that passes through it from surface to surface in a centralized position within the head of the present invention. This metallic plug provides the means by which the plugged flying body can be positioned in the desired location by use of the previously described magnetic positioning rod. The magnet located at the top of the magnetic positioning rod engages the metallic plug thereby holding the plugged flying body in the desired location. Additionally, the location of the metallic plug in the head of the plugged flying body—as opposed to being located in the upper central portion of the body—contributes to the life-like characteristics of this embodiment of the present invention.

An even further alternative embodiment of the present invention has been contemplated in which a feeding body is fitted with a magnetic plug instead of the weights described in a previous embodiment. The use of the magnetic plug provides two benefits over the previously described embodiments of the present invention. The first of these is that while providing enough weight to hold the resulting magnetic plug feeding body in place when simply thrown into a stubble field, it also allows for its positioning in conjunction with a steel cap positioning rod allowing for the deployment of a magnetic plug feeding body in the manner described for the flying bodies.

The second benefit of the use of the magnetic plug relates to the transport and storage of the magnetic plug feeding bodies when not in use. While previously described embodiments of the present invention employed a specialized storage rod for these purposes, the use of the magnetic plugs requires no ancillary equipment. Rather, the negative and positive sides of the magnetic plugs of two or more magnetic plug feeding bodies are placed in close proximity to each other. The opposite polarity of the two properly positioned magnetic plugs will be attracted to one another which will in turn serve to magnetically bind one magnetic plug feeding body to another. This process can be repeated as many times as necessary and provides a convenient and secure way to transport and store a plurality of the magnetic plug feeding bodies when not in use.

Finally, it must also be noted that it has been contemplated that the use of the metallic plug in conjunction with a flying body as described will work equally as well with a feeding body. Conversely, it has also been contemplated that the use of the magnetic plug in conjunction with a feeding body as described will work equally as well with a flying body. The later configuration will also bestow the advantages associated with the magnetic plug to the use, storage, and transportation of flying bodies.

For a better understanding of the present invention reference should be made to the drawings and the description in which there are illustrated and described preferred embodiments of the present invention.

DESCRIPTION OF THE DRAWINGS

FIG. 2 is a perspective view of the present invention illustrating the relationship between its body and the positioning rod.

FIG. 3 is a side elevation view of the present invention of FIG. 2.

FIG. 4 is a top elevation view of the present invention of FIG. 2.

FIG. 5 is a top elevation view of the body of the present invention that employs a graphic design that mimics the plumage of a juvenile individual of a specific species of waterfowl.

FIG. 10 is a side elevation of the present invention illustrating it as configured for storage.

FIG. 11 is a side elevation view of the present invention employing a two piece positioning rod.

FIG. 12 is a side elevation view of the positioning rod component of the present invention that is constructed in a collapsible manner.

FIG. 13 is a top elevation view of an alternative embodiment of the present invention that employs a weight to maintain it in the desired location.

FIG. 14 is a bottom elevation view of the alternative embodiment of the present invention of FIG. 13.

FIG. 15 is a side elevation cut-away view of the alternative embodiment of the present invention of FIG. 13 illustrating the manner of construction of weights and storage hole components.

FIG. 16 is a side elevation view of the alternative embodiment of the present invention illustrating how it is deployed in the field.

FIG. 17 is a side elevation view of the alternative embodiment of the present invention illustrating the manner by which a storage rod is employed to stack the decoys when not in use.

FIG. 18 is a side elevation view of an additional alternative embodiment of the present invention using a magnetic securement rod to deploy it in the field.

FIG. 19 is a side elevation view of a further alternative embodiment of the present invention using a loop and hook securement rod to deploy it in the field.

FIG. 24 is a top elevation view of an alternative embodiment of the present invention that employs a magnetic plug for securement purposes and which illustrates a Canada Goose detailed pattern.

FIG. 25 is a bottom elevation view of the alternative embodiment of the present invention of FIG. 24 illustrating an all white pattern.

FIG. 26 is a side elevation cut-away view of the alternative embodiment of the present invention taken along LINE 4 of FIG. 22 illustrating the configuration of the metallic plug with respect to the body.

FIG. 27 is a side elevation cut-away view of the alternative embodiment of the present invention of FIG. 22 illustrating its use with a magnetic positioning rod for positioning in the field.

FIG. 28 is a side elevation cut-away view of the alternative embodiment of the present invention taken along LINE 5 of FIG. 24 illustrating the configuration of the magnetic plug with respect to the body.

FIG. 29 is a side elevation view of the alternative embodiment of the present invention of FIG. 24 illustrating its manner of deployment in the field.

DESCRIPTION OF THE PREFERRED EMBODIMENT

Figure 1:
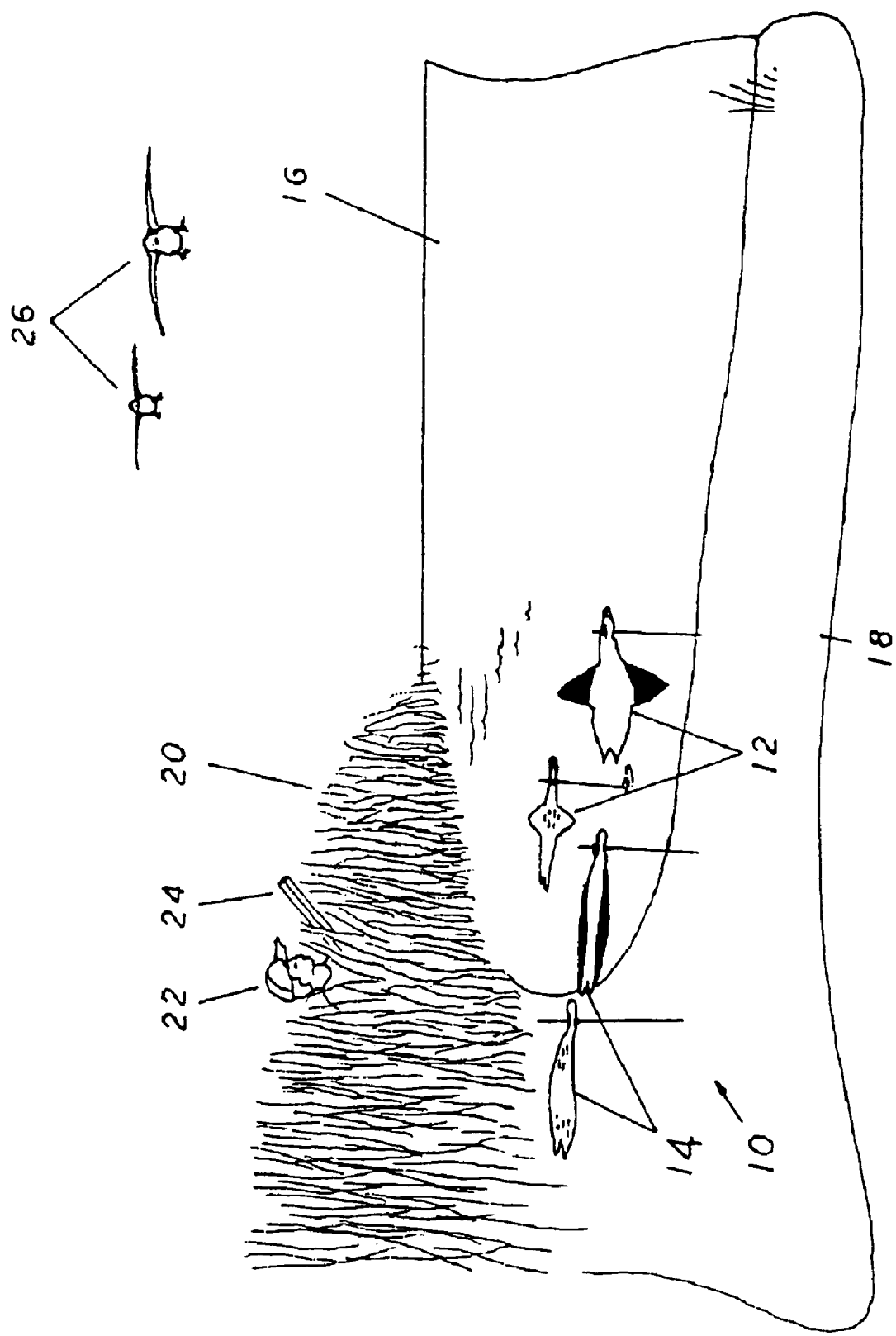
FIG. 1 is a pictorial view of a typical waterfowl hunting scene illustrating the manner in which the present invention is deployed to attract waterfowl into a specific location where the hunter is concealed.

Referring now to the drawings, and more specifically to FIG. 1, the wind articulated waterfowl decoy having distinct sides 10 that can be deployed within a hunting area to attract the desired species of waterfowl 26. In a typical hunting situation this is generally accomplished by placing a plurality of the decoys comprising the present invention in a desirable location, generally in and around a body of water 16, that is highly visible to waterfowl 26 as they fly by. Additionally, this FIGURE illustrates the use of individual decoys of varying designs. In this case this means the use of a flying decoy 12 and a feeding decoy 14 that will be discussed in greater detail below.

Ideally, the placement of the present invention is accomplished in such a manner so that there is cover 20 nearby giving the hunter 22 a place within which he can conceal himself and his firearm 24 from any approaching waterfowl 26. The presence of the decoys serves to draw waterfowl 26 to the area thereby by creating the illusion that there are already birds present in the area. This then provides the hunter 22 with the opportunity of harvesting the maximum number of birds allowed by law.

The placement of the individual decoys of the present invention is accomplished by the use of a positioning rod 28. The positioning rod 28 is a relatively small diameter section of metallic or other durable yet flexible material that can be easily inserted into the land 18 that either surrounds or underlies a body of water 16. This is normally done so that the positioning rod 28 assumes a generally vertical orientation. The body of the present invention is attached to the upper portion of the positioning rod 28 in such a manner so that it is capable of movement around this attachment.

The positioning rod 28 can be constructed in plurality of ways each of which are suitable for the differing conditions that are encountered in hunting situations. The simplest of these is a positioning rod 28 that is made up of a single piece of material. Some possible variations of the positioning rod 28 are illustrated in FIGS. 11 and 12. FIG. 11 illustrates a two-piece positioning rod 29 that is made up of an upper rod 62 and a lower rod 64 that are tied together by the use of the connector 66. The use of the two piece positioning rod 29 provides a means by which the user can break it down for easier transport while also allowing its overall length to be varied by the addition or subtraction of a section.

An additional possible construction method is illustrated in FIG. 12 that details the collapsible positioning rod 68. The collapsible positioning rod 68 is made up of an inner and outer rod, 70 and 72, that fit together in a slidable manner—the inner rod 70 sliding into the outer rod 72. Additionally, the length of the collapsible positioning rod 68 can be varied by the use of more such sections that are constructed in this stepped fashion. This method of construction produces a rod that can be expanded to lengthen the collapsible positioning rod 68 and slid into one another to shorten it. This also provides the benefits of allowing for the use of a long positioning rod 28 to deploy the present invention while providing for its easier transport through its collapsible nature.

It must also be noted with reference to the positioning rod 28 (including its variations) that it has been found that the use of fiberglass in their construction provides benefits to the operation of the present invention. The more flexible nature of the fiberglass (when compared to metallic construction materials) not only is relatively easy for the wind to bend, but also has a strong tendency to spring back to its natural shape. These characteristics impart more motion to the body 42 of the present invention when it is deployed in the wind. Additionally, the tendencies of the fiberglass to both easily deflect and to want to return to its natural shape imparts a highly erratic motion to the body 42 of the present invention. This highly erratic motion has been found to be very effective in attracting waterfowl 26 to a hunting area thereby enhancing the effectiveness of the present invention.

The general manner of construction of the body 42 of the present invention is further illustrated in FIGS. 2, 3, 4, 5, and 6. The body 42 of the present invention is constructed of a light weight but durable plastic such as depron or expanded polypropylene. The use of this material not only has benefits in the construction of the present invention as it is easily formed, but also it is very light yet strong enough to withstand impact and other forces commonly encountered in hunting situations. Additionally, the use of this material provides cost benefits as it is relatively inexpensive allowing hunters to purchase a variety of differing designs of the present invention. This allows them to adjust their hunting techniques to fit varying conditions.

The body 42 of the present invention is planar in its general configuration having two sides that roughly mimic the shape of waterfowl 26 when viewed from the side. The two-sided nature of the body 42 of the present invention is critical to its operation and will be discussed in greater detail below.

As stated above, the body 42 of the present invention can be shaped in a plurality of shapes making it adaptable and able to fit varying hunting conditions. One of these possible shapes as illustrated in these FIGURES is best described as having a flying body 32. The flying body 32 has an outline that roughly imitates a flying waterfowl 26 with extended wings 40, an extending head 34 and beak 36 on its forward end, and a tail 38 on its rearward end all of which surround the centrally located body 42 of the present invention.

Figure 9:
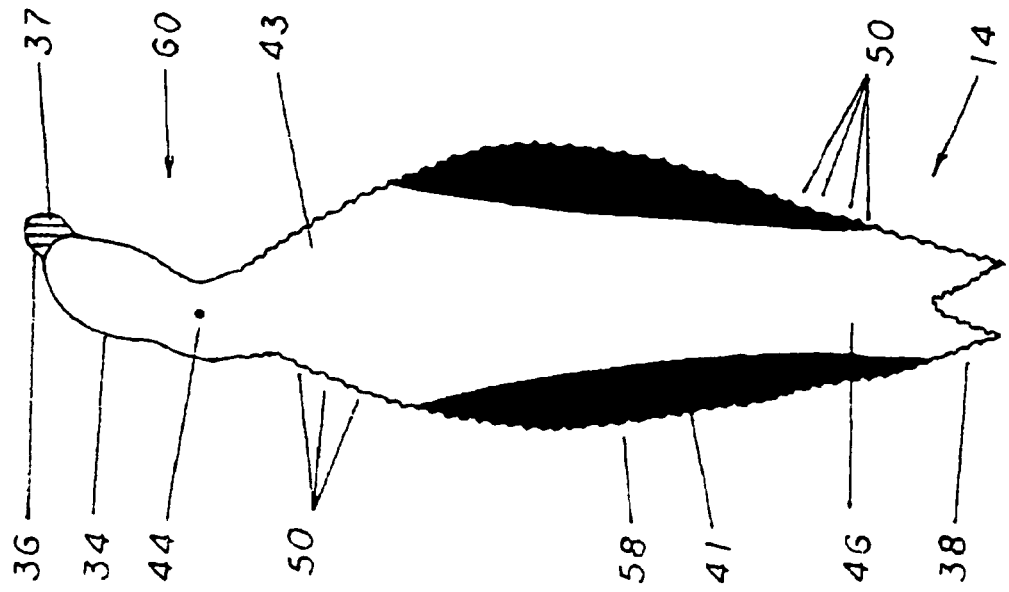
FIG. 9 is a top elevation view of a variation of the body of the present invention having folded wings and employing the adult coloration scheme.
Figure 8:
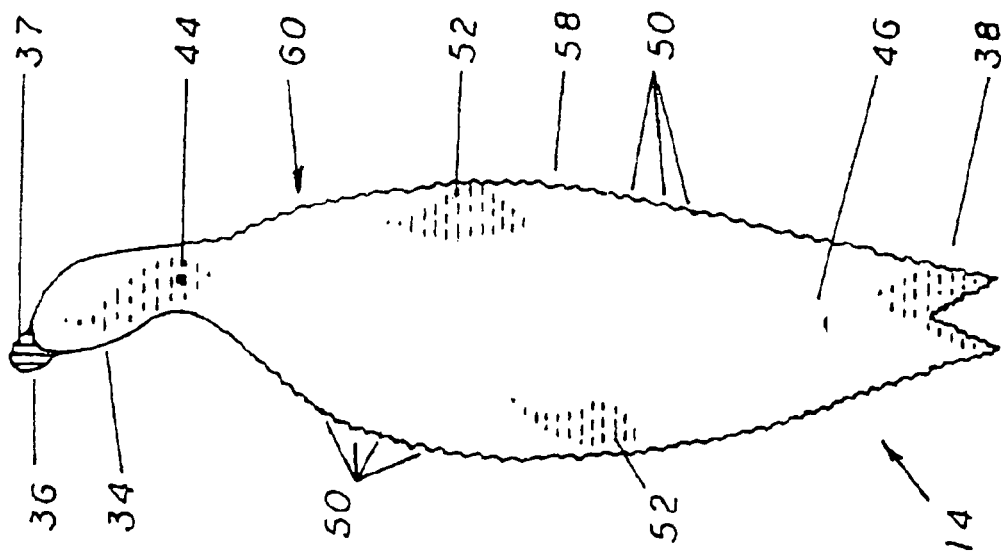
FIG. 8 is a top elevation view of a variation of the body of the present invention having folded wings and employing the juvenile coloration scheme.
Figure 21:
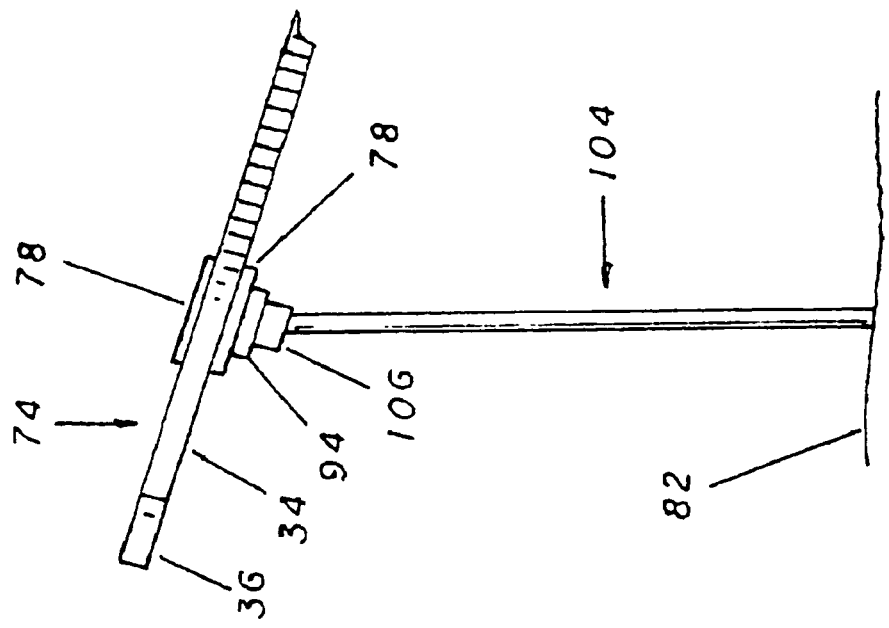
FIG. 21 is a side elevation view of a still further alternative embodiment of the present invention using a swivel securement rod to deploy it in the field.
Figure 20:
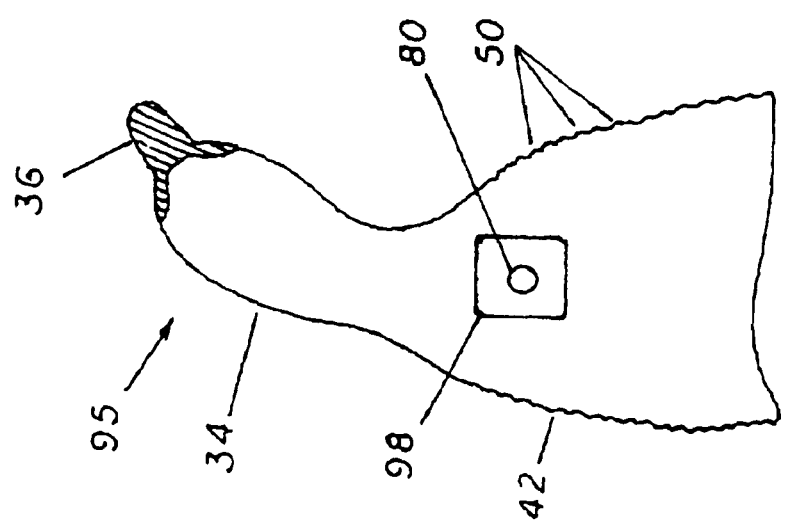
FIG. 20 is a top elevation view of the further alternative embodiment of FIG. 19.

An additional possible variation of the body 42 of the present invention is illustrated in FIGS. 8 and 9. This shape is referred to as the feeding body 60 and is typified by having a body 42 with folded wings 58. This shape is employed to mimic birds as seen from the air as they feed. The use of the feeding body 60 decoys in conjunction with the flying body 32 decoys is intended to create a more realistic hunting area thereby inducing greater numbers of the intended waterfowl 26 species to enter the area.

These FIGURES also illustrated a few of the possible graphic designs that can be employed by the present invention. As described above, the body of the present invention is generally planar thereby having two sides that are substantially identical to each other in their outer shape. This then means that each of these sides can be covered with a different graphic design. Thus, while one side of the body 42 of the present invention can be covered with a design that mimics one common species of waterfowl 26, the other side can be covered so that it mimics a different species or even a different member (like a juvenile) of the first species. This feature of the present invention provides a means by which a hunter 22 can double his stock of decoys without increasing the actual number that he owns. The graphic designs employed for this purpose are generally applied in the construction process by means of a silk screen printing process, but any other method of effectively applying the desired image would work as well.

Figure 6:
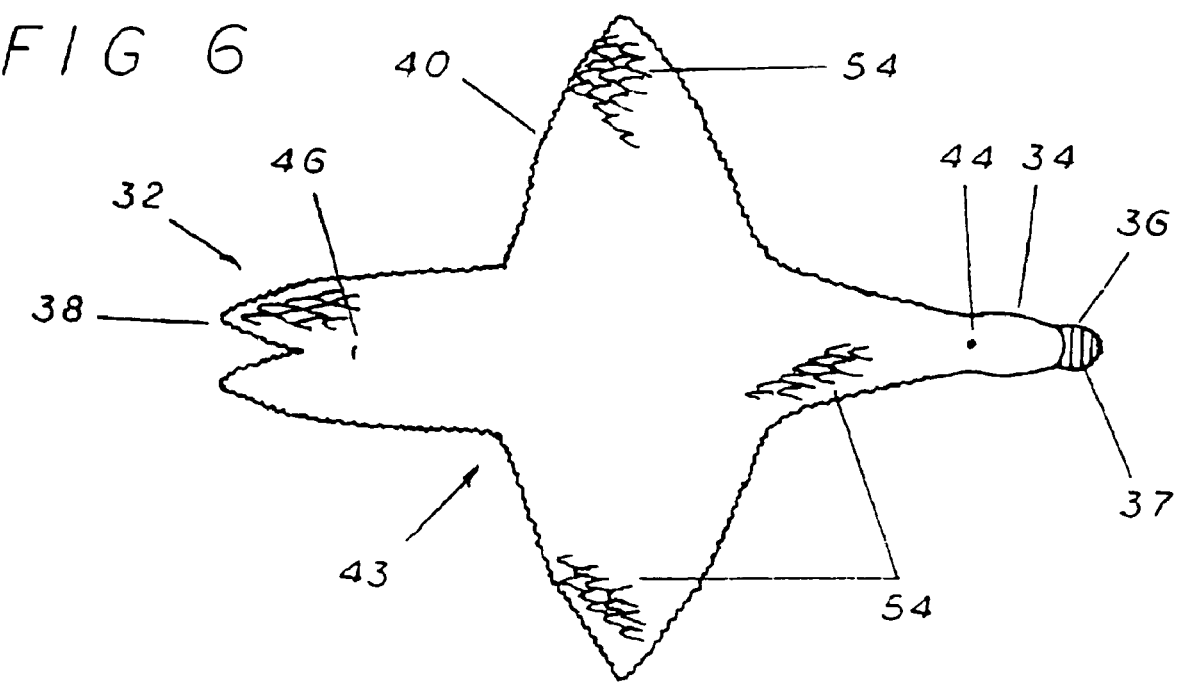
FIG. 6 is a top elevation of the body of the present invention that employs a different graphic design intended to mimic a typical waterfowl feather pattern.

As stated previously, any number of possible graphic designs are possible, but for the purposes of simplicity only a few are illustrated. The first of these is detailed in FIGS. 2, 4, and 9 which illustrate a pattern intended to mimic an adult Snow Goose. This design employs a white 43 body 42, head 34, and tail 38, black 41 extended wings 40, and a red 37 beak 36. Conversely, FIGS. 5 and 8 mimic a juvenile Snow Goose that is entirely grey 52 in color (excluding its red 37 beak 36). Finally, a still further possible graphic covering is illustrated in FIG. 6 that features a feather pattern 54 covering the entirety of the body 42 of the present invention.

Also illustrated in these images is the fluted edges 50 that form the outer edges of the body 42 of the present invention. The fluted edges 50 serve two purposes. The first of these is to help mimic the waterfowl feathers thereby enhancing its effectiveness. The second function is to affect the motion characteristics as the present invention is moved by passing air. As the wind passes over the fluted edges 50, they create turbulence that in turn cause the body 42 of the present invention to flutter in an erratic manner. This type of motion has been found to aid in the attraction of waterfowl 26 as it creates a realistic effect.

Figure 7:
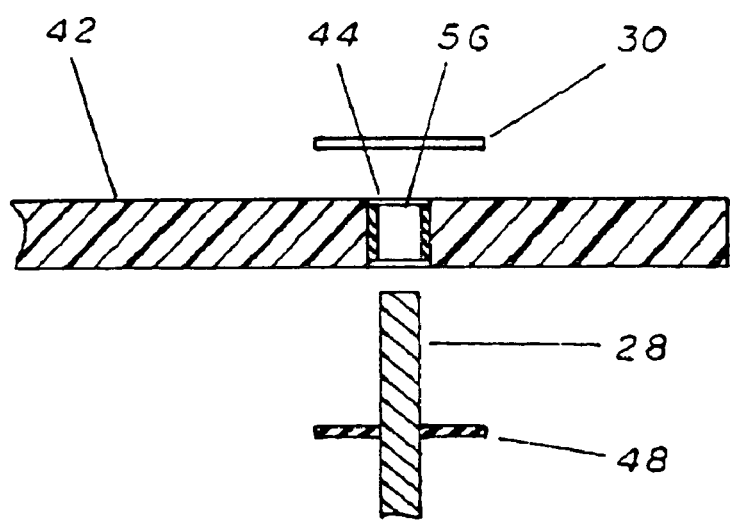
FIG. 7 is a side elevation cut-away view of the forward portion of the body of the present invention illustrating the construction of the rod attachment hole and the manner in which it engages the positioning rod.

The attachment of the body 42 of the present invention to the positioning rod 28 is accomplished by the use of a rod attachment hole 44 that passes through the body 42 of the present invention. These components and their operation are further detailed in FIGS. 3 and 7. The positioning of the rod attachment hole 44 with respect to the body 42 of the invention is most commonly accomplished towards its proximal end, or that portion of the body 42 that mimics the head 34 of a particular species of waterfowl 26. This manner of construction has been found to produce the most effective decoy as it allows the majority of the body 42 to be extended out from the positioning rod 28 in a horizontal position by the action of the wind. This produces a waterfowl decoy that appears lifelike to passing bird populations therefore drawing them to the hunting area and the concealed hunter 22.

As previously stated, the actual attachment of the body 42 to the positioning rod 28 is accomplished by passing the positioning rod 28 through a rod attachment hole 44. The rod attachment hole 44 is in turn lined with a rod sleeve 56. The rod sleeve 56 is generally made of a hard plastic or other similar material that has better wear properties than the body 42 of the present invention. Additionally, the rod sleeve 56 is constructed so that its outside diameter fits tightly within the opening of the rod attachment hole 44. This ensures that once properly positioned, the rod sleeve 56 will remain in the desired location. The inside diameter of the rod sleeve 56 is slightly larger than the outside diameter of the positioning rod 28. This allows the rod sleeve 56 to slide easily over the positioning rod 28 during installation and to easily move both rotationally and along the vertical axis during the operation of the body 42 of the present invention.

The securement of the body 42 of the present invention to the desired location on the positioning rod 28 is accomplished by the use of the upper and lower retainers, 30 and 48. The upper and lower retainers, 30 and 48, are essentially rubber (or other suitable material) washers that have an inside diameter that is slightly smaller than the outside diameter of the positioning rod 28 and an outside diameter that is larger than the rod attachment hole 44. The size of the inside diameter of the upper and lower retainers, 30 and 48, and the use of a pliable material in their construction allows for their placement along the axis of the positioning rod 28 in a manner that restrains the movement of the body of the present invention yet can be easily modified when necessary.

Therefore, the assembly of the present invention for use is accomplished in the following manner. First, the lower retainer 48 is pushed onto the positioning rod 28 and slid to the desired spot along its axis. Next, the body 42 of the present invention is fitted with the rod sleeve 56 and the unit is then slid onto the positioning rod 28 above the lower retainer 48. The body's 42 location on the positioning rod 28 is then secured by pushing the upper retainer 30 onto the positioning rod 28 above the body 42. This configuration then allows the body 42 to both freely rotate around its pivotal connection to the positioning rod 28 and to move laterally between the upper and lower retainers, 30 and 48. Finally, the completed unit can then be deployed by inserting the lower portion of the positioning rod 28 into the land 18 or bottom of a body of water 16 in the desired location in the hunting area.

The body 42 of the present invention is also capable of being folded and secured for storage and transportation. This capacity is illustrated in FIG. 10 which illustrates the relationship between the body 42 of the present invention and the positioning rod 28. The body is equipped with a storage hole 46 that passes through it towards its distal end. In the stored position 45, the proximal end of the body 42 is attached to the positioning rod 28 as described above by the use of the upper and lower retainers, 30 and 48, and related components. Additionally, the positioning rod 28 is also passed through the storage hole 46 as illustrated. This serves to retain the body 42 closer to the positioning rod 28 which has been found to be beneficial in transport and storage.

Additionally, a plurality of alternative embodiments of the present invention has been contemplated. The first of these is a simple weighted decoy 74 illustrated in FIGS. 13 and 14. The weighted decoys 74 differ from the previous embodiments primarily in the mechanisms employed to secure them in the desired location. The weighted decoy 74 is generally shaped much like the feeding body 60 having a central body 42 with a tail 38 at its rearward end and a head 34 at its forward. The head 34 is generally equipped with a beak 36 to enhance its overall visual character and fluted edges 50 to enhance its behavioral characteristics. Additionally, the weighted decoy 74 can employ similar coloration patterns as the previous embodiment such as a red 37 beak 36 or a white 43 reverse body 42 or unique coloration such as the illustrated mottled pattern 76.

The weights 78 fitted to the weighted decoy are generally metallic discs such as flat washers. It has been found that the use of these weights 78 has provided the desired characteristics of anchoring this embodiment of the present invention in the desired location while using a cheep and readily available material to do so. These weights 78 are attached on either side of the weighted decoy's 74 body 42 opposite of one another and in its longitudinal center just behind the weighted decoy's head 34 and beak 36.

The weights 78 also contain a centralized storage hole 80 that not only passes through them, but through the body 42 of the weighted decoy 74 as well. This method of construction is further illustrated in FIG. 15. The storage hole 80 provides a means for storing and transporting a plurality of the weighted decoys 74 (to be discussed in greater detail below) when not in use.

The weighted decoys 74 are typically deployed in the stubble of a harvested grain field as illustrated in FIG. 16. These fields generally consist of the grain stubble 84 left over from the grain harvesting process and are very attractive to waterfowl as there is always residual grain on the ground 82 that provides a excellent food source. The weighted decoys 74 are deployed simply by tossing them onto the grain stubble 84 in the desired locations. The weights 78, by virtue of their added weight and location on the body 42 of the weighted decoys 74, provide enough stability to keep them in the desired area while still allowing for a small degree of motion in windy circumstances that enhances their life-like appearance and effectiveness of attracting waterfowl to the area.

The design of the weights 78 and their central storage hole 80 provides an additional capability to the present invention, the ability for a plurality of the individual weighted decoys 74 to be stored and transported in a compact manner. This is accomplished by the use of the storage rod 86 the use and design of which is illustrated in FIG. 17. The storage rod 86 is a long and thin cylindrical rod having a lower retainer 88 fixedly attached to its lower end and a removable upper retainer 90. With the upper retainer 90 removed, a plurality of weighted decoys 74 can be placed on the storage rod 86 by passing it through the storage holes 80 located in the center of the weights 78. When the desired number of weighted decoys 74 have been thus positioned on the storage rod 86, the upper retainer 90 is replaced to secure them for storage or transport. The use of this system provides for the secure storage and transport of a large number of weighted decoys 74 in a relatively small space. Additionally, the storage rod system may also be employed with the previously described flying and feeding decoys, 12 and 14, of the present invention with slight modifications to their manner of construction.

An additional embodiment of the present invention has been contemplated in which a magnetic positioning rod 92 is employed to suspend a weighted decoy 74 in a horizontal manner up off of the ground 82. This embodiment of the present invention is illustrated in FIG. 18. The magnetic positioning rod 92 has a magnet 94 fixedly attached to its upper end. This magnet 94 is configured in a manner that allows it to easily engage and secure one of the weights 78 on a weighted decoy 74 while the other end of the magnetic positioning rod 92 is anchored in the ground 82. The use of the magnetic positioning rod 92 provides for the placement of a weighted decoy 74 in a manner so that it can more easily interact with the wind thereby increasing its motion and life-like appearance. Thus, the use of the magnetic positioning rod 92 can increase the waterfowl attracting effectiveness of the present invention.

A further alternative embodiment of the present invention has been contemplated employing the use of a loop and hook decoy 95. The loop and hook decoy 95 is constructed exactly as described above for the weighted decoy 74 except that the weights 78 are replaced by loop patch 98 and the magnetic positioning rod 92 is replaced by a loop and hook positioning rod 96. The loop patches 98 are placed on either side of the body 42 of the loop and hook decoy 95 in the same position that surrounds the storage hole 86.

The loop and hook positioning rod 96 is in turn fitted with an attachment head 102 on its upper end. The attachment head 102 in turn provides for the fixed attachment of a hook patch 100. When pressed together, the loop and hook patches, 98 and 100, form a secure attachment that can be broken with the application of the correct amount of force. This configuration thus provides a manner to position a loop and hook decoy 95 that is as described above for the previous embodiment of the present invention. The primary benefit offered by the loop and hook decoy 95 is that it is lighter than the weighted decoy 74. The reduction in weight can enhance its interaction with the wind thereby increasing its life-like characteristics. Additionally, the weight reduction results in a lighter assembly when a plurality of the loop and hook decoys 95 are installed on a storage rod 86 for the purposes of storage or transport as described above.

A still further alternative embodiment of the present invention has been contemplated that employs a swivel positioning rod 104 to position a weighted (or other embodiment) decoy 74 up off of the ground 82. The swivel positioning rod 104 has a swivel head 106 pivotally attached to its upper end. The swivel head 106 then provides for the fixed attachment of a magnet 94 (or other attachment means) that is then employed to position a weighted decoy 74 in the desired location. The use of the swivel positioning rod 104 provides an additional dimension to the motion of the weighted decoy 74 allowing it not only to spin around its point of pivotal attachment, but also to pivot in the vertical plane relative to this same point of attachment. The use of the swivel positioning rod 104 provides an additional measure of life mimicking motion that further increases the effectiveness of the present invention.

Figure 23:
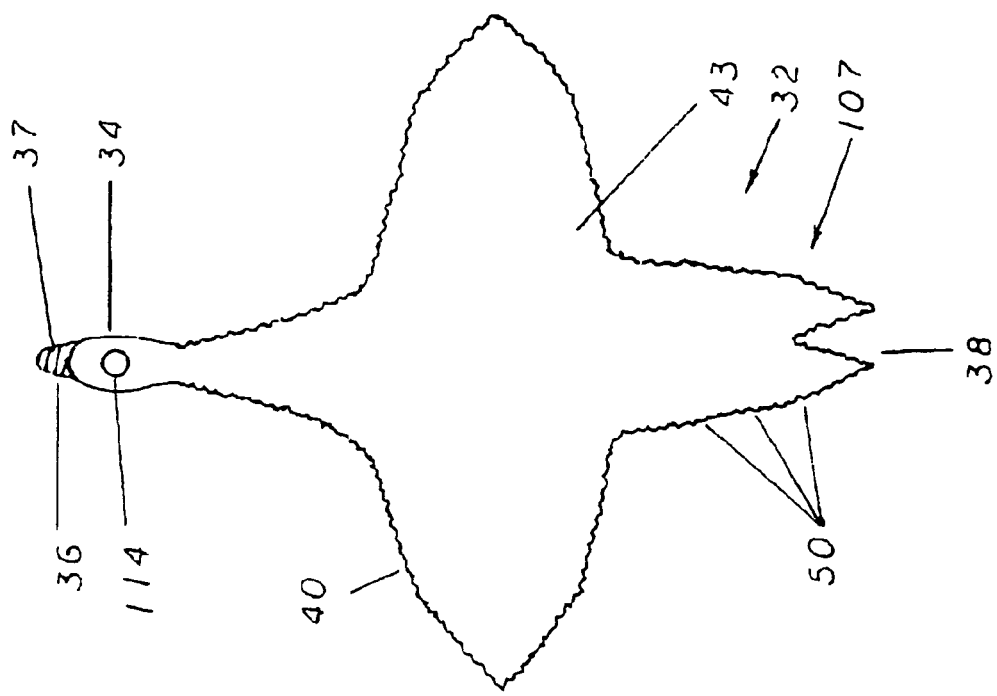
FIG. 23 is a bottom elevation view of the alternative embodiment of the present invention of FIG. 22 illustrating an all white pattern.
Figure 22:
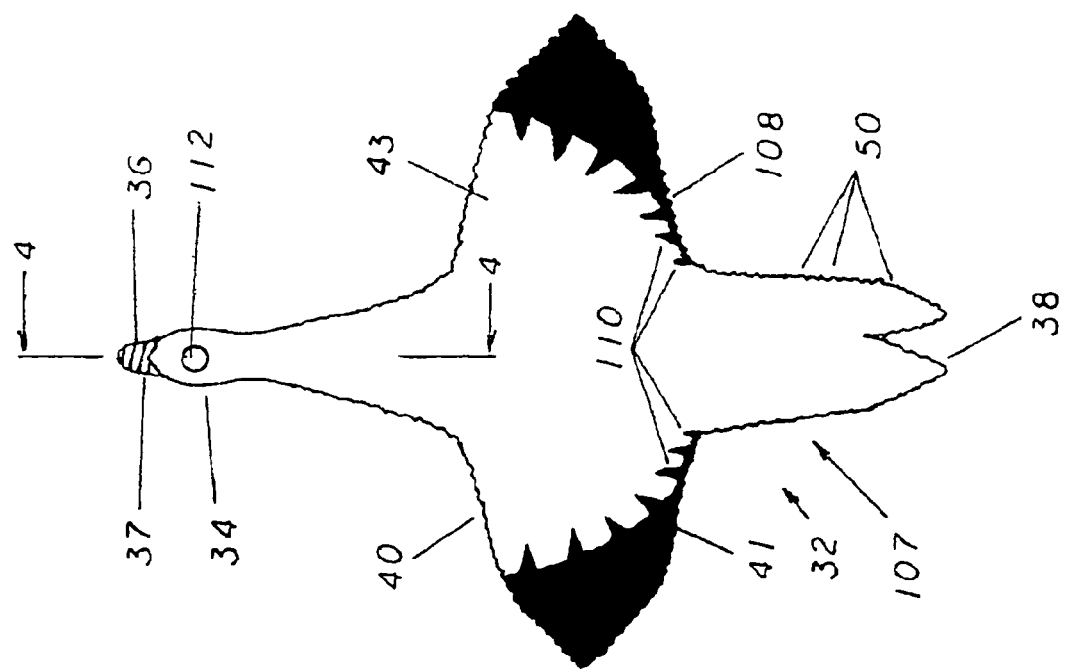
FIG. 22 is a top elevation view of an alternative embodiment of the present invention that employs a metallic plug for securement purposes and which illustrates a detailed black and white Snow Goose pattern.

A yet further alternative embodiment of the present invention as illustrated in FIGS. 22, 23, and 24 has been contemplated in which a flying body 32 is fitted with a cylindrical metallic plug 112 that passes through it from surface to surface in a centralized position within its head 34. The metallic plug 112 is most commonly formed of a piece of steel rod that is of a length that corresponds to the thickness of the flying body 32 and of a diameter and of an outside diameter that is slightly larger than the inside diameter of the plug hole 114 formed in the head of the flying body 32. This manner of construction allows the metallic plug 112 to fit tightly within the plug hole 114 thereby requiring no ancillary means of attachment. Additionally, the length of the metallic plug 112 ensures that when properly installed its end surfaces will be flush with the outside surfaces of the flying body 32. This is important to other functions of the plugged flying body that will be discussed in greater detail below.

These FIGURES also illustrate additional decorative patterns that can be applied to the present invention to enhance its operational characteristics. Most notable of these is the detailed Snow Goose pattern 108 characterized by distinct areas of black 41 and white 43 and a red 37 beak 36. While this is similar to previously described patterns, its primary distinction is the fluted pattern edge 110 separating the areas of black 41 and white 43. The use of the fluted pattern edge 110 adds realism to the plugged flying body 107 thereby enhancing its effectiveness as a decoy.

In much the same manner as described for some of the previous embodiments of the present invention, one of the metallic plug's 112 functions is to provide the means by which the plugged flying body 107 can be positioned in the desired location by use of the previously described magnetic positioning rod 92 as illustrated in FIG. 27. The magnet 94 located at the top of the magnetic positioning rod 92 engages the metallic plug 112 thereby holding the plugged flying body 107 in the desired location. Additionally, the location of the metallic plug 112 in the head 34 of the plugged flying body 107 contributes to the life-like characteristics of this embodiment of the present invention.

An even further alternative embodiment of the present invention has been contemplated in which a feeding body 60 is fitted with a magnetic plug 120 instead of the weights 78 described in a previous embodiment as illustrated in FIGS. 24, 25, and 28. The magnetic plug 120 is attached to the magnetic plug feeding body 116 by the use of a magnetic plug hole 122 located in the upper central portion of the feeding body 60. The magnetic plug 120 is slightly larger in its outside diameter than the inside diameter of the magnetic plug hole 122. Thus, the insertion of the magnetic plug 120 into the magnetic plug hole 122 creates enough friction between them to eliminate the need for any additional boding agent.

Figure 31:
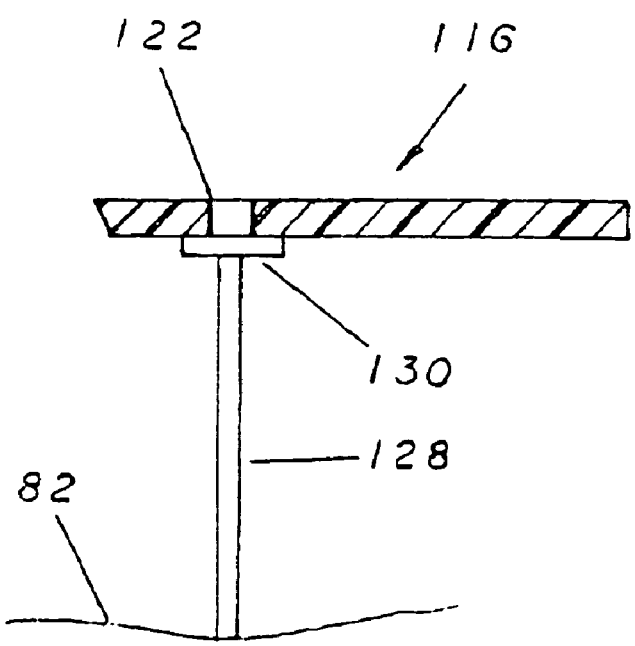
FIG. 31 is a side elevation cut-away view of the alternative embodiment of the present invention of FIG. 24 illustrating its use with a steel cap positioning rod for positioning in the field.

The use of the magnetic plug 120 provides two benefits over the previously described embodiments of the present invention. The first of these is that while providing enough weight to hold the resulting magnetic plug feeding body 116 in place when simply thrown onto the grain stubble 84 of a harvested field (as illustrated in FIG. 29), it also allows for its positioning in conjunction with a steel cap positioning rod 128 (as illustrated in FIG. 31) allowing for the deployment of a magnetic plug feeding body 120 in the manner described for the flying bodies 32. In this manner of deployment, the magnetic plug 120 interacts with a steel cap 130 located at the upper end of the steel cap positioning rod 128 to form the necessary attachment between the two components. The lower end of the steel cap positioning rod 128 is then implanted into the ground 82 in the location that the user desires for the purpose of attracting waterfowl to a hunting area.

Figure 30:
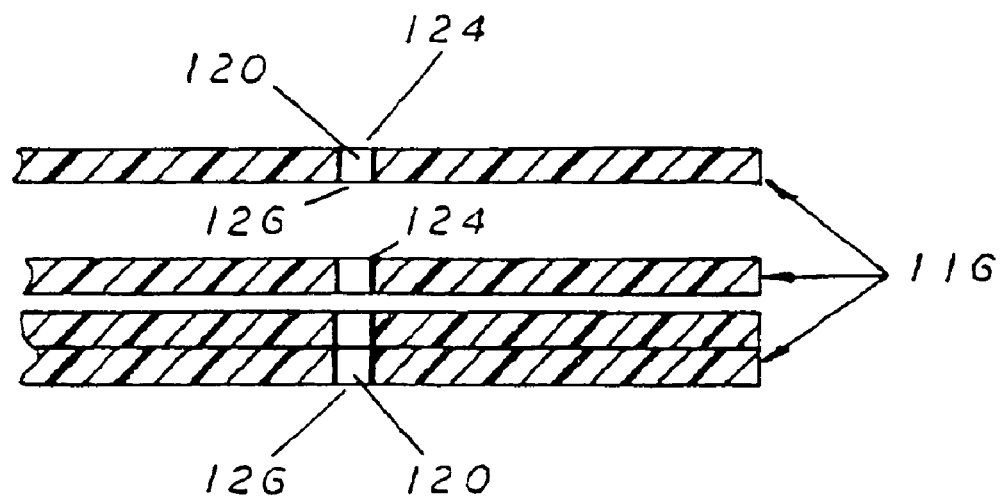
FIG. 30 is a side elevation cut-away view of a plurality of the alternative embodiments of the present invention of FIG. 24 illustrating the manner by which the magnetic plugs are employed to configure them for transport or storage.

The second benefit of the use of the magnetic plug 120 relates to the transport and storage of the magnetic plug feeding bodies 116 when not in use. While previously described embodiments of the present invention employ a specialized storage rod 86 for these purposes, the use of the magnetic plugs 120 eliminates the need for any ancillary equipment. Rather, the positive and negative sides, 124 and 126, of the magnetic plugs 120 of two or more magnetic plug feeding bodies 116 are placed in close proximity to each other. The opposite polarity of the two properly positioned magnetic plugs 120 will be attracted to one another which will in turn serve to magnetically bind one magnetic plug feeding body 116 to another as illustrated in FIG. 30. This process can be repeated as many times as necessary resulting in a transport stack 123. Thus, the use of the magnetic plugs 120 provides a convenient and secure way to bind two or more magnetic plug feeding bodies 116 together thereby allowing for their efficient transport and storage when not in use.

These FIGURES also illustrate additional decorative patterns that can be applied to the present invention to enhance its operational characteristics. Most notable of these is the Canada Goose detailed pattern 117 characterized by distinct areas of black feathers 121 on the head 34 and tail 38, white accent feathers 119 on the side of the head 34 and lower portions of the feeding body 60, and body feathers 118 covering the remaining portion of the feeding body 60. The use of the Canada Goose detailed pattern 117 adds realism to the magnetic feeding body 116 thereby enhancing its effectiveness as a decoy.

Finally, it must also be noted that it has been contemplated that the use of the metallic plug 112 in conjunction with a flying body 32 as described will work equally as well with a feeding body 60. Conversely, it has also been contemplated that the use of the magnetic plug 120 in conjunction with a feeding body 60 as described will work equally as well with a flying body 32. The later configuration will also bestow the advantages associated with the magnetic plug 120 to the use, storage, and transportation of flying bodies 32.

Although the present invention has been described in considerable detail with reference to certain preferred versions thereof, other versions are possible. Therefore, the spirit and scope of the appended claims should not be limited to the description of the preferred versions contained herein.

What is claimed:

1. A wind articulated bird decoy, comprising:
   a support rod having a lower end and an upper end, wherein said upper end is comprised of a metal material and wherein said lower end is secured within a ground surface;
   a first decoy body comprised of a substantially planar configuration and a flexible material, said first decoy body having a body section with an outer edge, a tail portion, a head portion, a first side and a second side opposite of said first side; and
   a magnetic plug positioned within said head portion, wherein said magnetic plug has a first end adjacent to said first side and a second end adjacent to said second side, wherein said first end is positive charged and wherein said second end is negatively charged;
   wherein said magnetic plug extends from said first side to said second side;

wherein said magnetic plug magnetically secures said first decoy body to said upper end of said support rod, wherein said first decoy body rotates about a longitudinal axis of said support rod.

2. The wind articulated bird decoy of claim 1, wherein said first side is painted to represent a first type of bird and wherein said second side is painted to represent a second type of bird, wherein said second type of bird is different from said first type of bird.

3. The wind articulated bird decoy of claim 1, wherein said first end of said magnetic plug is exposed via a first opening within said first side and wherein said second end of said magnetic plug is exposed via a second opening within said second side.

4. The wind articulated bird decoy of claim 1, wherein said first decoy body is comprised of a foam material.

5. The wind articulated bird decoy of claim 4, wherein said foam material is comprised of expanded polypropylene.

6. The wind articulated bird decoy of claim 1, wherein said first decoy body has a shape of a waterfowl bird.

7. A wind articulated bird decoy, comprising:
a plurality of decoy bodies comprised of a substantially planar configuration and a flexible material, each of said plurality of decoy bodies having a body section with an outer edge, a tail portion, a head portion, a first side, a second side opposite of said first side and a magnetic plug positioned within said head portion;
wherein said magnetic plug has a first end adjacent to said first side and a second end adjacent to said second side, wherein said first end is positive charged and wherein said second end is negatively charged;
wherein said magnetic plug extends from said first side to said second side;
wherein said plurality of decoy bodies are stacked in a substantially parallel manner upon one another with each said magnetic plug of said plurality of decoy bodies magnetically securing said plurality of decoy bodies together.

8. The wind articulated bird decoy of claim 7, wherein said first side is painted to represent a first type of bird and wherein said second side is painted to represent a second type of bird, wherein said second type of bird is different from said first type of bird.

9. The wind articulated bird decoy of claim 7, wherein said first end of said magnetic plug is exposed via a first opening within said first side and wherein said second end of said magnetic plug is exposed via a second opening within said second side.

10. The wind articulated bird decoy of claim 7, wherein said plurality of decoy bodies are comprised of a foam material.

11. The wind articulated bird decoy of claim 10, wherein said foam material is comprised of expanded polypropylene.

12. The wind articulated bird decoy of claim 7, wherein said plurality of decoy bodies have a shape of a waterfowl bird.

13. A wind articulated bird decoy, comprising:
a plurality of decoy bodies comprised of a substantially planar configuration and a flexible material, each of said plurality of decoy bodies having a body section with an outer edge, a tail portion, a head portion, a first side, a second side opposite of said first side and a magnetic plug positioned within said head portion;
wherein said magnetic plug has a first end adjacent to said first side and a second end adjacent to said second side, wherein said first end is positive charged and wherein said second end is negatively charged;
wherein said plurality of decoy bodies are stacked in a substantially parallel manner upon one another with each said magnetic plug of said plurality of decoy bodies magnetically securing said plurality of decoy bodies together;
wherein said first side is painted to represent a first type of bird and wherein said second side is painted to represent a second type of bird, wherein said second type of bird is different from said first type of bird;
wherein said first end of said magnetic plug is exposed via a first opening within said first side and wherein said second end of said magnetic plug is exposed via a second opening within said second side;
wherein said magnetic plug extends from said first side to said second side;
wherein said plurality of decoy bodies are comprised of a foam material, wherein said foam material is comprised of expanded polypropylene;
wherein said plurality of decoy bodies have a shape of a waterfowl bird.

14. A wind articulated bird decoy, comprising:
a plurality of decoy bodies comprised of a substantially planar configuration and a flexible material, each of said plurality of decoy bodies having a body section with an outer edge, a tail portion, a head portion, a first side, a second side opposite of said first side and a magnetic plug positioned within said head portion;
wherein said magnetic plug has a first end adjacent to said first side and a second end adjacent to said second side, wherein said first end is positive charged and wherein said second end is negatively charged;
wherein said first end of said magnetic plug is exposed via a first opening within said first side and wherein said second end of said magnetic plug is exposed via a second opening within said second side;
wherein said plurality of decoy bodies are stacked in a substantially parallel manner upon one another with each said magnetic plug of said plurality of decoy bodies magnetically securing said plurality of decoy bodies together.

15. The wind articulated bird decoy of claim 14, wherein said magnetic plug extends from said first side to said second side.

* * * * *